(12) United States Patent
Yanagi et al.

(10) Patent No.: US 8,659,495 B2
(45) Date of Patent: Feb. 25, 2014

(54) WIRELESS COMMUNICATION DEVICE

(75) Inventors: Takashi Yanagi, Tokyo (JP); Yasuhiro Nishioka, Tokyo (JP); Toru Fukasawa, Tokyo (JP); Hiroaki Miyashita, Tokyo (JP); Tomohiro Mizuno, Tokyo (JP); Takuro Sasaki, Tokyo (JP); Hirokatsu Okegawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 304 days.

(21) Appl. No.: 13/122,025

(22) PCT Filed: Jul. 22, 2009

(86) PCT No.: PCT/JP2009/063100
§ 371 (c)(1),
(2), (4) Date: Mar. 31, 2011

(87) PCT Pub. No.: WO2010/050278
PCT Pub. Date: May 6, 2010

(65) Prior Publication Data
US 2011/0175790 A1    Jul. 21, 2011

(30) Foreign Application Priority Data

Oct. 27, 2008  (JP) .................... PCT/JP2008/069433

(51) Int. Cl.
*H01Q 1/50*    (2006.01)
(52) U.S. Cl.
USPC .......................................... 343/857; 343/767
(58) Field of Classification Search
USPC .......................... 343/857, 767, 700 MS, 702
See application file for complete search history.

(56) References Cited

U.S. PATENT DOCUMENTS

| 7,324,061 | B1 | 1/2008 | Hadley |
| 2002/0175873 | A1 | 11/2002 | King et al. |
| 2004/0256644 | A1 | 12/2004 | Kugler et al. |
| 2005/0093677 | A1* | 5/2005 | Forster et al. ................ 340/10.1 |

(Continued)

FOREIGN PATENT DOCUMENTS

| JP | 10 98329 | 4/1998 |
| JP | 2002 358494 | 12/2002 |

(Continued)

OTHER PUBLICATIONS

Office Action issued Dec. 25, 2012 in Japanese Patent Application No. 2010-535708 with English language translation.

(Continued)

*Primary Examiner* — Thien M Le
(74) *Attorney, Agent, or Firm* — Oblon, Spivak, McClelland, Maier & Neustadt, L.L.P.

(57) ABSTRACT

A wireless communication device whose impedance can be matched with an arbitrary load impedance and that can be broadened in operating frequency band even when choosing an input impedance of an IC chip freely is not possible. The wireless communication device includes: a first conductor; a second conductor disposed substantially parallel to the first conductor; a hole formed in the second conductor; a capacitive coupling mechanism disposed adjacent to the hole; and a communication circuit which has at least one of a radio wave transmitting function and a radio wave receiving function. The communication circuit is connected through the capacitive coupling mechanism to two sites on the second conductor that are near borders between the second conductor and the hole.

18 Claims, 15 Drawing Sheets

(56) References Cited

U.S. PATENT DOCUMENTS

| | | | |
|---|---|---|---|
| 2005/0093678 A1 | 5/2005 | Forster et al. | |
| 2006/0000915 A1* | 1/2006 | Kodukula et al. | 235/492 |
| 2006/0261950 A1 | 11/2006 | Arneson et al. | |
| 2008/0252425 A1 | 10/2008 | Okegawa et al. | |
| 2009/0090907 A1 | 4/2009 | Kugler et al. | |
| 2010/0181379 A1 | 7/2010 | Okegawa et al. | |

FOREIGN PATENT DOCUMENTS

| | | |
|---|---|---|
| JP | 2005 510886 | 4/2005 |
| JP | 2008-9514 A | 1/2008 |
| JP | 2008-61158 A | 3/2008 |
| JP | 2008-66808 A | 3/2008 |
| JP | 2008 66838 | 3/2008 |
| JP | 2008-66838 A | 3/2008 |
| JP | 2008-67342 A | 3/2008 |
| JP | 2008 538029 | 10/2008 |
| WO | WO 2006/105162 A2 | 10/2006 |
| WO | 2007 102360 | 9/2007 |
| WO | WO 2008/126451 A1 | 10/2008 |

OTHER PUBLICATIONS

Ittipiboon, A., et al., "A Modal Expansion Method of Analysis and Measurement on Aperture-Coupled Microstrip Antenna," IEEE Transactions on Antennas and Propagation, vol. 39, No. 11, pp. 1567-1574, (Nov. 1991).

Rao, K.V.S., et al., "Wideband Metal Mount UHF RFID Tag," IEEE International AP-S Symposium Digest, Session 401.3, San Diego, total 4 pages, (Jul. 2008).

International Search Report issued Aug. 18, 2009 in PCT/JP09/063100 filed Jul. 22, 2009.

U.S. Appl. No. 13/265,049, filed Oct. 18, 2011, Nishioka, et al.

Combined Chinese Office Action and Search Report issued Mar. 14, 2013, in Chinese Patent Application No. 200980142585.8 with English translation and English translation of category of cited documents.

Extended European Search Report issued Jul. 24, 2013, in European Patent Application No. 09823391.9.

* cited by examiner

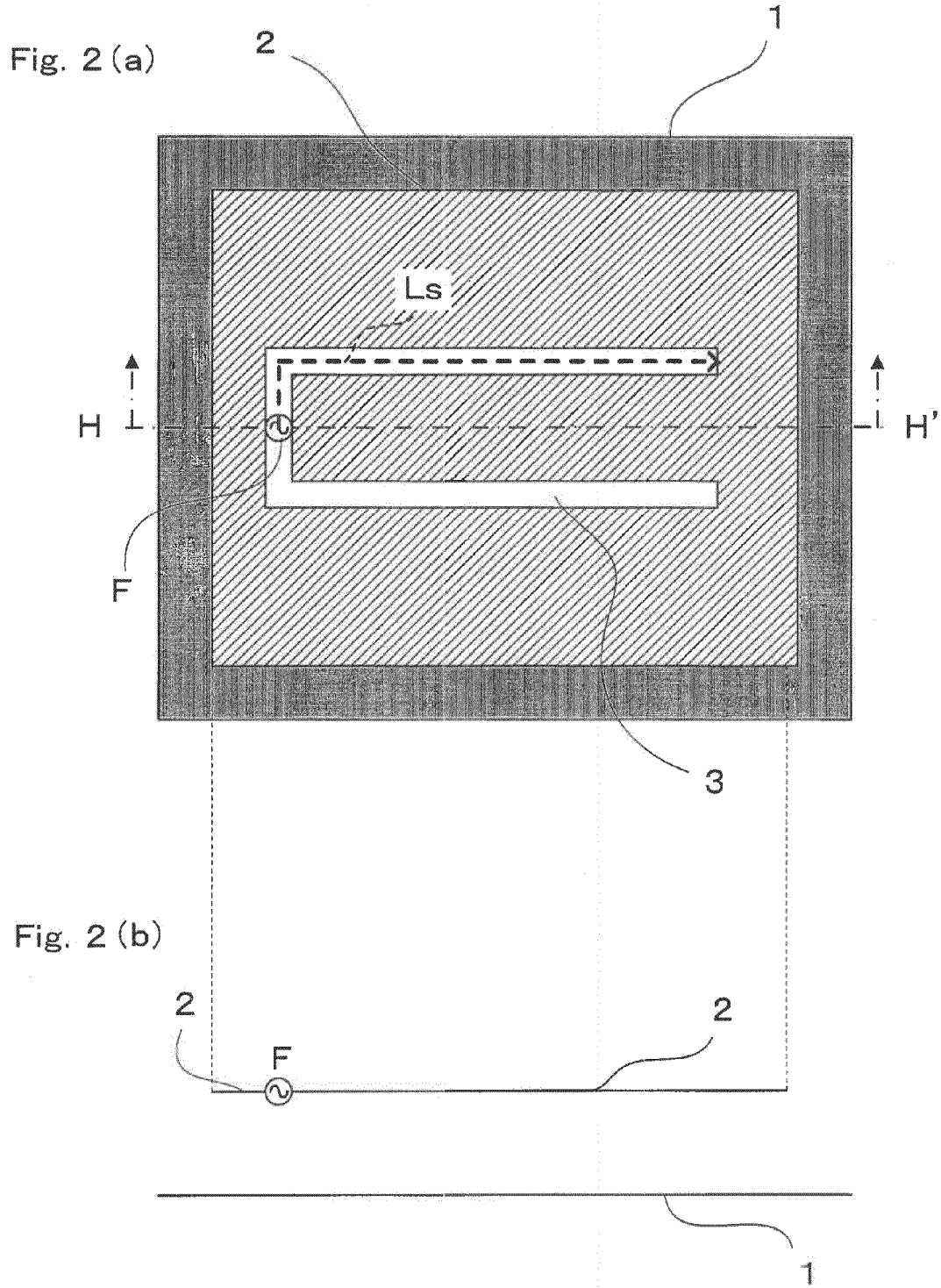

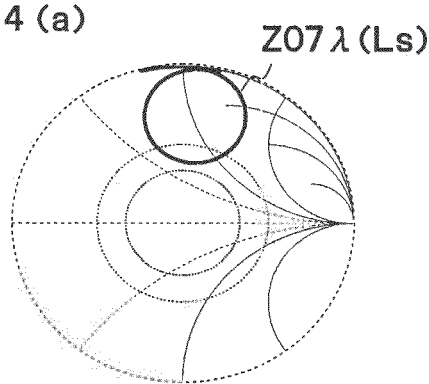
Fig. 4 (a)   Z07λ(Ls)
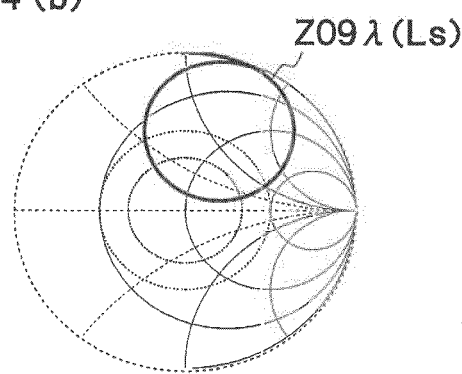
Fig. 4 (b)   Z09λ(Ls)
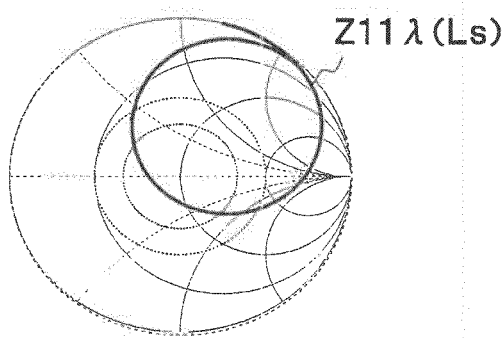
Fig. 4 (c)   Z11λ(Ls)

US 8,659,495 B2

WIRELESS COMMUNICATION DEVICE

TECHNICAL FIELD

The present invention relates to a wireless communication device, and more particularly, to a radio frequency identification (RFID) tag that uses a radiation field.

BACKGROUND ART

An RFID system that uses a UHF band has a longer communication range than an electromagnetic induction (or "induction field") RFID system, which uses an HF band, and, for that reason, has been used mainly in the field of logistics. Accordingly, an RFID tag is in some cases attached to a metal object (conductive object) for use.

When attached to a metal object or installed near a metal object, a conventional RFID tag that uses a dipole antenna has a problem in that the antenna ceases to work or the communication range diminishes greatly under the influence of the metal object. Realizing an RFID tag that is capable of reducing performance degradation when attached to a metal object is therefore demanded.

In view of this demand, there has been proposed an RFID tag that can be installed in an object irrespective of whether the object is conductive or non-conductive by mounting an RFID IC chip in a slot provided in a radiating conductor of a microstrip antenna (see Patent Literature 1, for example).

The operating frequency band of a microstrip antenna that is used in an RFID tag described in Patent Literature 1 is a narrowband because no measure is provided to maintain the impedance characteristics of the microstrip antenna in a broader band.

At present, UHF-band RFID systems use different frequencies in different regions: 952 to 954 MHz in Japan, 902 to 928 MHz in the United States, and 865 to 868 MHz in Europe.

CITATION LIST

Patent Literature

[PTL 1] JP 2007-243296 A

SUMMARY OF INVENTION

Technical Problem

A problem of conventional wireless communication devices is that, in the case of the antenna used in the RFID tag of Patent Literature 1, for example, the operating frequency band of the antenna which is a narrow band requires each user of an RFID system to use an RFID tag that is appropriate for the user's region.

Another problem is that, when a conventional narrow-band RFID tag is used without modification in an RFID system that uses a different frequency band, impedance mismatch lowers the reception power and consequently reduces the range of communication with an RFID reader/writer.

The present invention has been made to solve the problems described above, and an object of the present invention is to obtain an RFID tag which has a broader band as the operating frequency band of an antenna used in the RFID tag and can thus be used universally in any region, and to obtain a wireless communication device whose impedance can be matched with an arbitrary load impedance and which can be broadened in operating frequency band even when choosing an input impedance of an IC chip freely is not possible.

Solution to Problem

A wireless communication device according to the present invention includes: a first conductor; a second conductor which is disposed substantially parallel to the first conductor; a hole which is formed in the second conductor; capacitive coupling means which are disposed adjacent to the hole; and a communication circuit which has at least one of a radio wave transmitting function and a radio wave receiving function, in which the communication circuit is connected through the capacitive coupling means to two sites on the second conductor that are near borders between the second conductor and the hole.

Advantageous Effects of Invention

According to the present invention, a wireless communication device is obtained whose impedance can be matched with an arbitrary load impedance and which can be broadened in operating frequency band even when choosing an input impedance of an IC chip freely is not possible.

BRIEF DESCRIPTION OF DRAWINGS

FIGS. 2(a) and 2(b) A plan view (FIG. 2(a)) and a sectional view (FIG. 2(b) illustrating-a microstrip antenna to which the first embodiment of the present invention is applied. (First Embodiment)

FIGS. 4(a), 4(b), and 4(c) Smith charts illustrating variations in impedance characteristics that depend on the slot length of the first embodiment of the present invention. (First Embodiment)

DESCRIPTION OF EMBODIMENTS

First Embodiment

Figure 1:
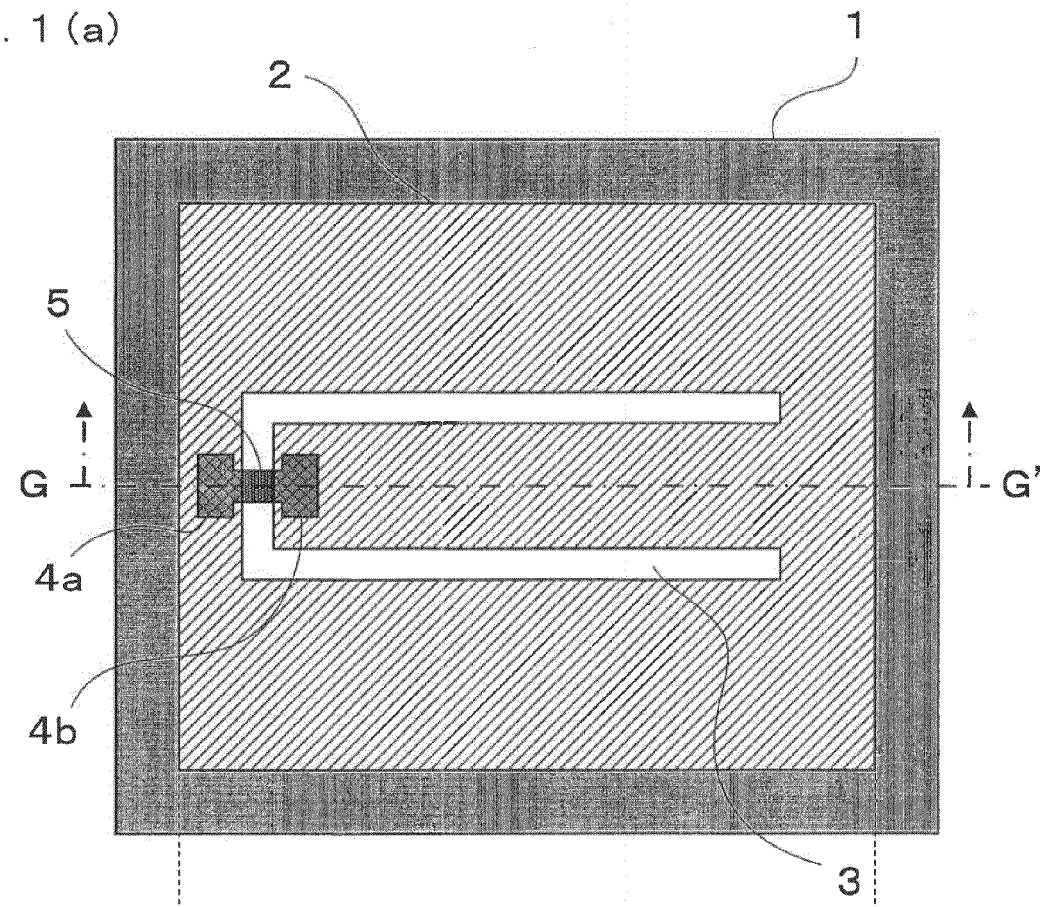
FIGS. 1(a) and 1(b) A plan view FIG. 1(a)) and a sectional view (FIG. 1(b)) illustrate a wireless communication device according to a first embodiment of the present invention. (First Embodiment)
Figure 1:
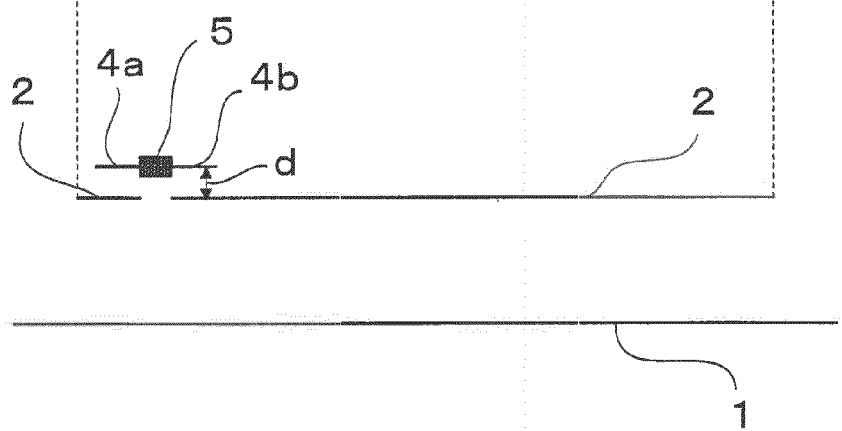

FIG. 1 are a plan view and a sectional view illustrating a wireless communication device according to a first embodiment of the present invention, and illustrate the structure of an RFID tag which functions as a wireless communication device.

FIG. 1(a) is a plan view, and FIG. 1(b) is a sectional view taken along the line G-G' of FIG. 1(a).

In FIG. 1, the RFID tag includes a ground conductor 1, a radiation conductor (hereinafter, simply referred to as "conductor") 2, a slot line (hereinafter, simply referred to as "slot") 3, capacitive coupling means 4a and 4b, and an IC chip 5.

The ground conductor 1 is a conductor of a finite size and has, for example, a rectangular shape as illustrated in FIG. 1(a). The conductor 2 is a plate-like conductor and has, for example, a rectangular shape as the ground conductor 1 does.

The conductor 2 is disposed substantially parallel to the ground conductor 1 with a gap therebetween, and constitutes together with the ground conductor 1a microstrip antenna. The conductor 2 is set to a size that allows the conductor 2 to resonate at a given operating frequency. As long as the conductor 2 has a size that allows the conductor 2 to resonate at a given operating frequency, the shape of the conductor 2 is not limited to a rectangular shape and can be chosen freely.

The conductor 2 is provided with the slot 3 formed by removing a part of the conductor 2. The shape of the slot 3 is, for example, an "angular letter C shape" as illustrated in FIG. 1(a).

The capacitive coupling means 4a and 4b are plate-like conductors having a rectangular shape, for example, and are disposed substantially parallel to the conductor 2 with a gap d therebetween as illustrated in FIG. 1(b). The capacitive coupling means 4a and 4b are not limited to a rectangular shape and can have a circular shape, a triangular shape, or other freely chosen shapes as long as a given level of capacitive coupling is obtained with respect to the conductor 2.

The capacitive coupling means 4a and 4b are disposed individually so as to face each other across the slot 3.

The IC chip 5 is an integrated circuit having a storing function, a computing function, a transmitting/receiving function, and other functions. The IC chip 5 is interposed between the capacitive coupling means 4a and 4b, which stretch across the slot 3, and is connected to the capacitive coupling means 4a and 4b.

With the structure of FIG. 1, the power of a radio wave that is received by the microstrip antenna constituted of the ground conductor 1 and the conductor 2 is supplied to the IC chip 5 via the capacitive coupling means 4a and 4b, and drives the IC chip 5.

The operation and effects of the RFID tag according to the first embodiment of the present invention which is illustrated in FIG. 1 are described next with reference to numerical calculation results of a magnetic field analysis.

Because the antenna operates the same way in transmission and in reception owing to the reversibility of the antenna, the following description deals with a case in which a voltage is supplied to a place where the IC chip 5 is connected.

A structure constituted of the ground conductor 1, the conductor 2, and the slot 3 is considered first in order to describe the operation of the slot 3.

FIG. 2 illustrate a structure in which the capacitive coupling means 4a and 4b and the IC chip 5 are removed from FIG. 1. FIG. 2(a) is a plan view and FIG. 2(b) is a sectional view taken along the line H-H' of FIG. 2(a).

In FIG. 2, Ls represents a slot length from the center of the slot 3 to the end of one half of the slot 3, and F represents a feeding point at which a voltage is applied to the slot 3.

When a voltage applied to the slot 3 excites the slot 3, a magnetic field is generated in the slot 3 and coupled by magnetic field coupling to an internal magnetic field of the microstrip antenna constituted of the ground conductor 1 and the conductor 2.

As a result, the slot 3 excites the microstrip antenna constituted of the ground conductor 1 and the conductor 2.

An equivalent circuit diagram of a slot-excited microstrip antenna such as this is found in known documents (for example, Apisak Ittipiboon, et al., "A Model Expansion Method of Analysis and Measurement on Aperture-Coupled Microstrip Antenna", IEEE Trans. Antennas and Propagat., vol. 39, no. 11, pp. 1567-1574, 1991).

Figure 3A:
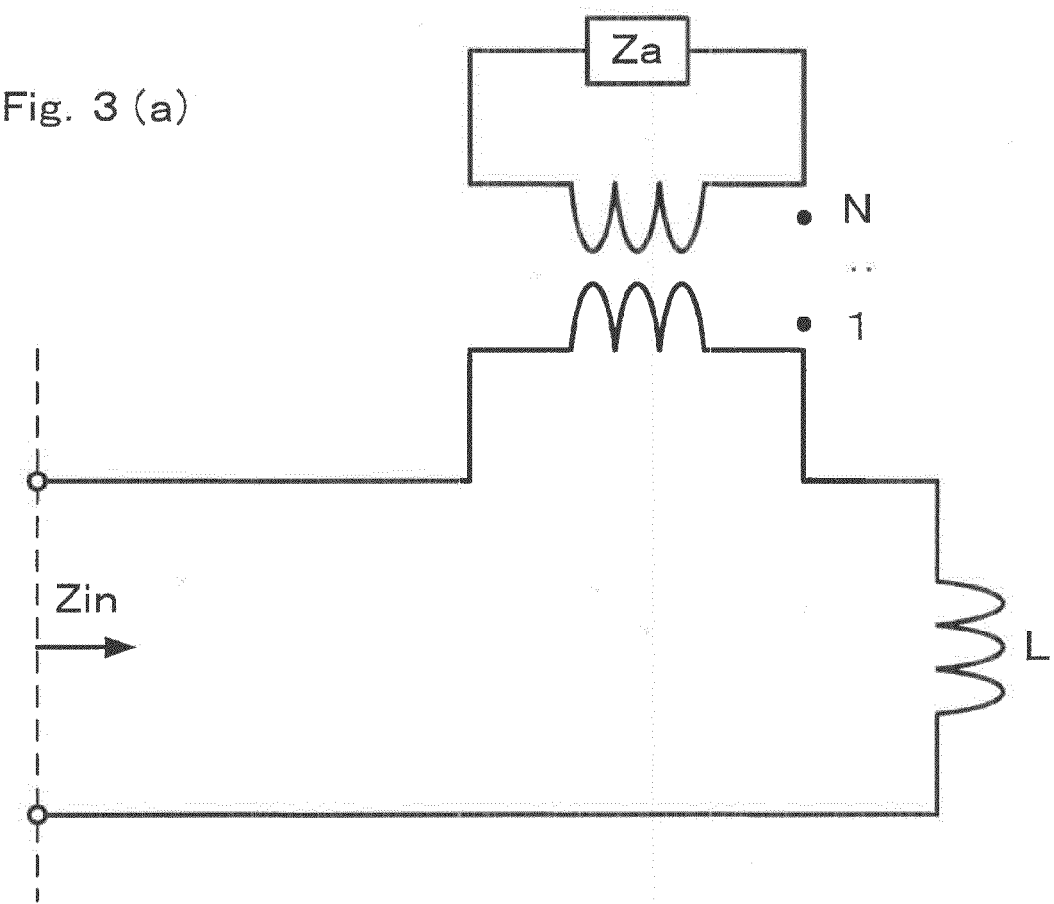
FIGS. 3(a) and 3(b) Equivalent circuit diagrams of the microstrip antenna of FIGS. 2(a) and 2(b). (First Embodiment)

FIG. 3(a) is an equivalent circuit diagram of the known document mentioned above, and is expressed with a transformer (having a turn ratio of "1:N").

In FIG. 3(a), Zin represents an input impedance viewed from the feeding point F (FIG. 2), Za represents the impedance of the microstrip antenna constituted of the ground conductor 1 and the conductor 2 (FIG. 2), and L represents an inductance obtained by the slot 3.

Figure 3B:
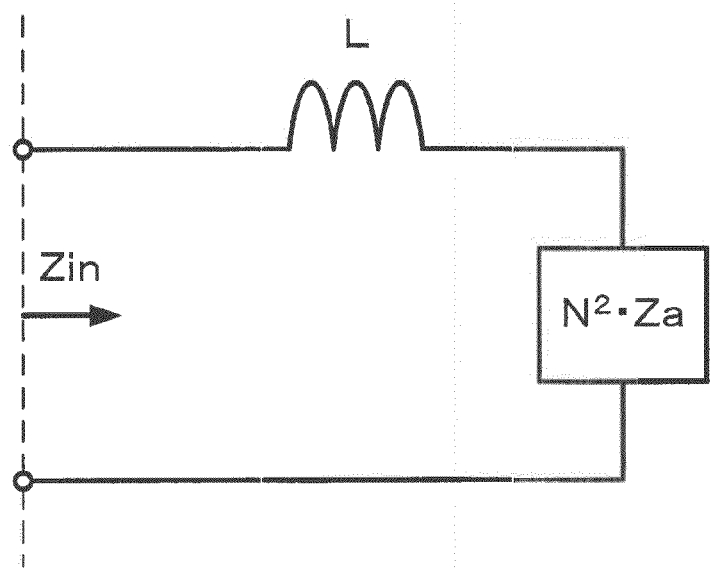

When the impedance of a secondary side of the transformer is converted to a primary side in FIG. 3(a), a circuit of FIG. 3(a) is translated into an equivalent circuit of FIG. 3(b).

In the resultant circuit structure, the inductance L is connected in series with respect to the impedance Za of the microstrip antenna multiplied by "the square of N" ($=N^2 \cdot Za$).

FIG. 4 are Smith charts illustrating variations in impedance characteristics that depend on the slot length Ls, and illustrate an example of changes in impedance characteristics viewed from the feeding point F (FIG. 2).

In FIG. 4(a), $Z07\lambda$ (Ls) represents an impedance locus observed when Ls=0.07λ. In FIG. 4(b), $Z09\lambda$ (Ls) represents an impedance locus observed when Ls=0.09λ. In FIG. 4(c), Z11λ (Ls) represents an impedance locus observed when Ls=0.11λ. The symbol λ represents a free space wavelength with respect to the center frequency of the operating frequency of (the frequency used by) the wireless communication device.

A comparison among FIGS. 4(a), 4(b), and 4(c) reveals that the impedance loci Z07λ (Ls), Z09λ (Ls), and Z11λ (Ls) move to an inductive reactance side as the slot length Ls lengthens.

In other words, the comparison reveals that the slot 3 operates as the inductance L inserted in series with respect to the microstrip antenna constituted of the ground conductor 1 and the conductor 2.

The operation of the capacitive coupling means 4a and 4b is described next.

Because the capacitive coupling means 4a and 4b are disposed substantially parallel to the conductor 2 with the gap d therebetween, a parallel-plate capacitor is formed in the portion where the capacitive coupling means 4a and 4b face each other. The capacitive coupling means 4a and 4b are coupled to each other by capacitive coupling at a high frequency.

The capacitive coupling means 4a and 4b, which are also disposed to stretch across the slot 3, operate as a capacitance C inserted in series with respect to the slot 3. The capacitance C of the capacitive coupling means 4a and 4b has a relation expressed by the following Expression (1) when calculated as a static capacitance.

[Numerical Expression 1]

$$C = \varepsilon \frac{S}{d} \quad (1)$$

where S represents the area of a portion of the capacitive coupling means 4a or the capacitive coupling means 4b that faces the conductor 2, d represents the gap between the capacitive coupling means 4a or the capacitive coupling means 4b and the conductor 2, and ∈ represents a dielectric constant between the capacitive coupling means 4a or the capacitive coupling means 4b and the conductor 2.

From the above, the operation of the wireless communication device according to the first embodiment of the present invention which is illustrated in FIG. 1 is described with reference to an equivalent circuit diagram of FIG. 5.

Figure 5:
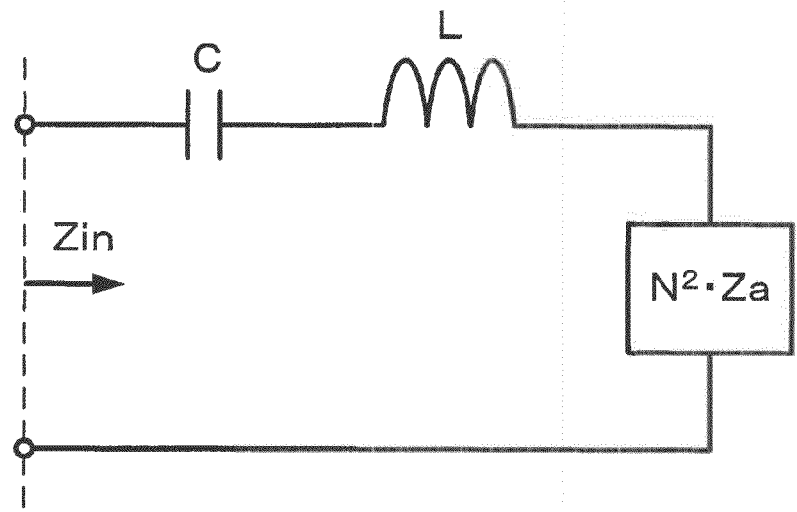
FIG. 5 An equivalent circuit diagram illustrating the operation in the first embodiment of the present invention. (First Embodiment)

In FIG. 5, the capacitance C provided by the capacitive coupling means 4a and 4b is added to the circuit described above (FIG. 3(b)). In other words, a circuit of FIG. 5 has a structure in which the capacitance C is added in series with respect to the inductance L.

The wireless communication device according to the first embodiment of the present invention is thus equivalent to a structure in which an LC series resonant circuit is connected to a microstrip antenna that has parallel resonance characteristics, and is accordingly broadened in operating frequency band.

A method of adjusting the degree of coupling between the microstrip antenna, which is constituted of the ground conductor 1 and the conductor 2, and the slot 3 is described next.

The degree of coupling between the microstrip antenna and the slot 3 relates closely to the magnitude of a "twist" in an impedance locus on a Smith chart, and is an important parameter in broadening the operating frequency band.

Figure 6:
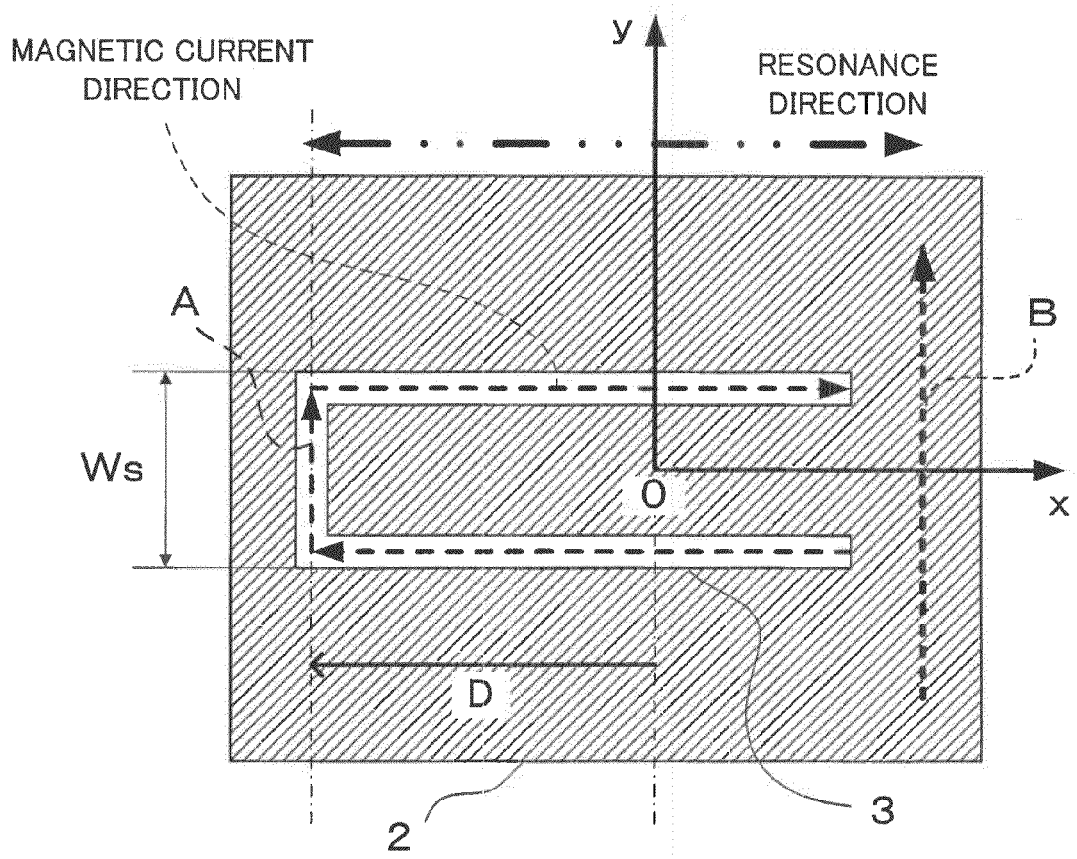
FIG. 6 A plan view illustrating the degree of coupling between the microstrip antenna and a slot to illustrate the operation in the first embodiment of the present invention. (First Embodiment)

FIG. 6 is a plan view illustrating the degree of coupling between the microstrip antenna and the slot 3, and illustrates a magnetic current flowing along the slot 3 at one instant and the direction (broken-line arrow B) of the internal magnetic field of the microstrip antenna constituted of the ground conductor 1 and the conductor 2.

In FIG. 6, the magnetic field coupling between the microstrip antenna, which is constituted of the ground conductor 1 and the conductor 2, and the slot 3 occurs in a portion (length Ws) corresponding to the broken-line arrow A, which is parallel to the direction of the internal magnetic field (broken-line arrow B), and the microstrip antenna and the slot 3 are not coupled in a direction orthogonal to the direction of the internal magnetic field. In the following description, the length Ws of the portion where the magnetic field coupling occurs is referred to as "magnetic field coupling length".

The degree of coupling can therefore be changed by changing the magnetic field coupling length Ws in FIG. 6.

Figure 7:
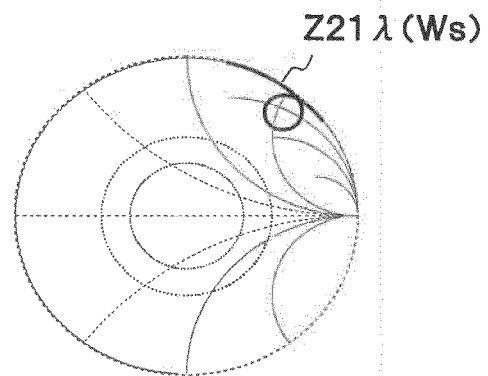
FIGS. 7(a), 7(b), and 7(c) Smith charts illustrating variations in impedance characteristics that depend on the length of magnetic field coupling in the first embodiment of the present invention. (First Embodiment)
Figure 7:
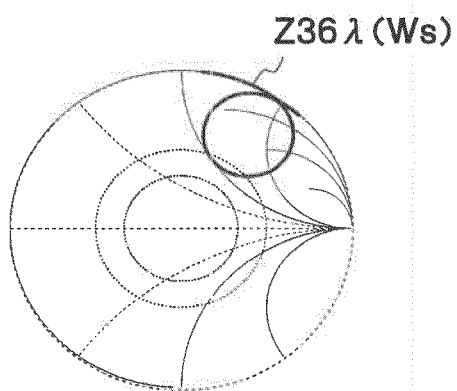
Figure 7:
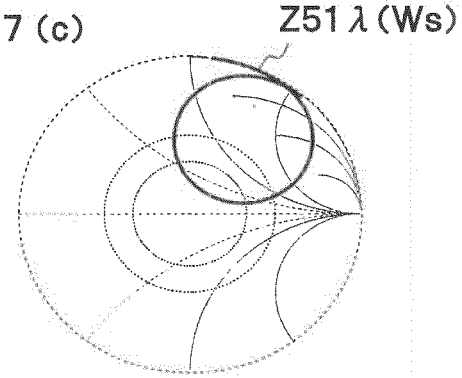

FIG. 7 are Smith charts illustrating variations in impedance characteristics that depend on the magnetic field coupling length Ws, and illustrate an example of changes in impedance characteristics viewed from the feeding point F (FIG. 2) when the magnetic field coupling length Ws is changed with the slot length Ls (FIG. 2) fixed to 0.11λ.

In FIG. 7(a), Z21λ (Ws) represents an impedance locus observed when Ws=0.021λ. In FIG. 7(b), Z36λ (Ws) represents an impedance locus observed when Ws=0.036λ. In FIG. 7(c), Z51λ (Ws) represents an impedance locus observed when Ws=0.051λ.

A comparison among FIGS. 7(a), 7(b), and 7(c) reveals that the "twist" of an impedance locus on a Smith chart becomes larger as the magnetic field coupling length Ws increases.

It is known that an internal magnetic field of a microstrip antenna generally reaches maximum at the center of a radiating element in the resonance direction.

When the center of the conductor 2 in FIG. 6 is an origin O, a surface of the conductor 2 is an x-y plane, the resonance direction of the conductor 2 is an x axis, and an axis orthogonal to the resonance direction is a y axis, an internal magnetic field Hy of the microstrip antenna in a basic mode ($TM_{10}$ mode) is expressed by the following Expression (2).

[Numerical Expression 2]

$$H_y = \frac{j\omega\varepsilon}{k^2} \cdot \frac{\pi}{a} \cdot \frac{V_0}{t} \cos\left(\frac{\pi}{a}x\right) \quad (2)$$

where "a" represents the length of the conductor 2 in the resonance direction, ω represents an angular frequency, ∈ represents a dielectric constant between the ground conductor 1 and the conductor 2, k represents the wave number in a dielectric material, and Vo represents a voltage at an edge of the conductor 2.

It can therefore be assumed that the magnetic field coupling between the internal magnetic field of the microstrip antenna, which is constituted of the ground conductor 1 and the conductor 2, and the slot 3 is strengthened as an offset interval D between the portion corresponding to the broken-line arrow in FIG. 6 and the center of the conductor 2 in the resonance direction (origin O) decreases.

Figure 8:
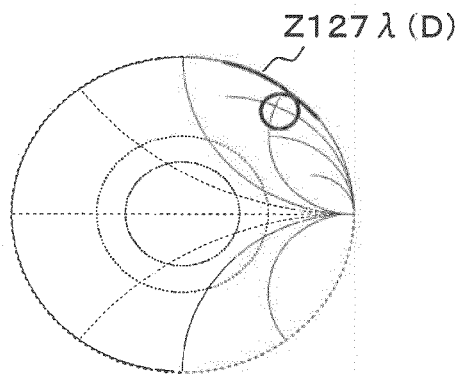
FIGS. 8(a), 8(b), and 8(c) Smith charts illustrating variations in impedance characteristics that depend on the offset interval in the first embodiment of the present invention. (First Embodiment)
Figure 8:
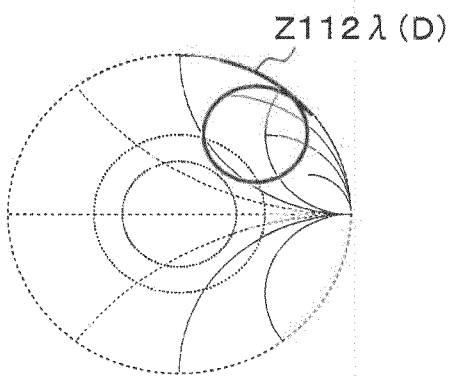
Figure 8:
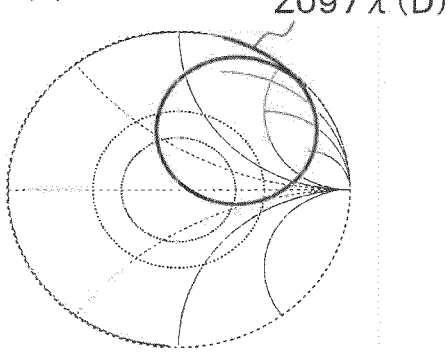

FIG. 8 are Smith charts illustrating variations in impedance characteristics that depend on the offset interval D, and illustrate an example of changes in impedance characteristics viewed from the feeding point F (FIG. 2) when the offset interval D is changed with the slot length Ls (FIG. 2) fixed to 0.11λ and the magnetic field coupling length Ws (FIG. 6) fixed to 0.021λ.

In FIG. 8(a), Z127λ (D) represents an impedance locus observed when D=0.127λ. In FIG. 8(b), Z112λ (D) represents an impedance locus observed when D=0.112λ. In FIG. 8(c), Z097λ (D) represents an impedance locus observed when D=0.097λ.

A comparison among FIGS. 8(a), 8(b), and 8(c) reveals that the "twist" of an impedance locus on a Smith chart becomes larger as the offset interval D decreases.

As described above, in the equivalent circuit according to the first embodiment of the present invention which is illustrated in FIG. 5, the inductance L is adjusted through the slot length Ls and the capacitance C is adjusted through the capacitive coupling means 4a and 4b.

The degree of coupling between the slot 3 and the microstrip antenna can be adjusted through the magnetic field coupling length Ws of the slot 3, or through the offset interval D of the slot 3.

Because the inductance L, the capacitance C, and the degree of coupling can be adjusted independently of one another, the impedance can be matched with an arbitrary load impedance.

In short, impedance matching optimum for the input impedance of the IC chip 5 is realized and a broadband wireless communication device is obtained.

While the capacitive coupling means 4a and 4b in the structure of FIG. 1 stretch across the center of the slot 3, the position in the slot 3 where the capacitive coupling means 4a and 4b stretch across the slot 3 is not limited to the center of the slot 3.

Figure 9:
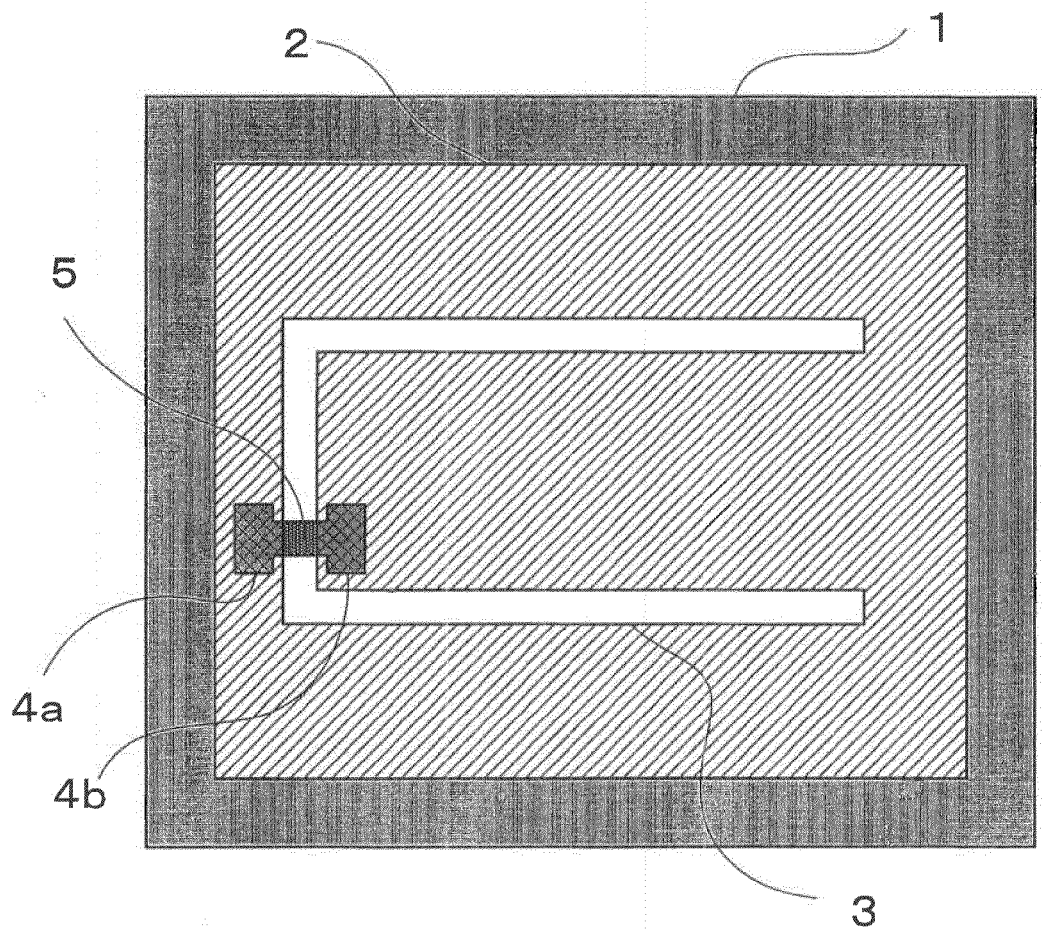
FIG. 9 A plan view illustrating another structural example of the wireless communication device according to the first embodiment of the present invention. (First Embodiment)

For instance, the capacitive coupling means 4a and 4b may be disposed at a position offset from the center of the slot 3 as illustrated in FIG. 9.

The slot 3 in FIG. 1 is formed to have an "angular letter C shape", but the direction of the slot 3 may be changed as long as adequate magnetic field coupling is obtained between the microstrip antenna, which is constituted of the ground conductor 1 and the conductor 2, and the slot 3.

Figure 10:
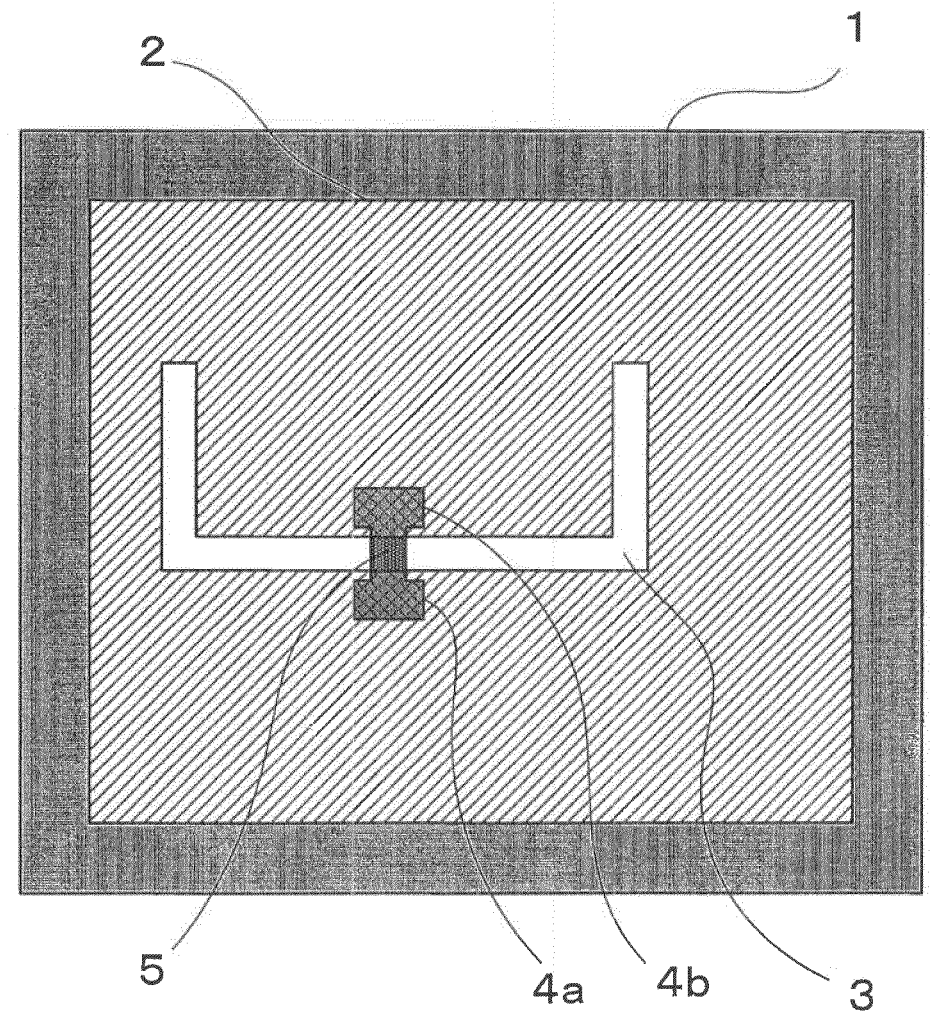
FIG. 10 A plan view illustrating still another structural example of the wireless communication device according to the first embodiment of the present invention. (First Embodiment)
Figure 11A:
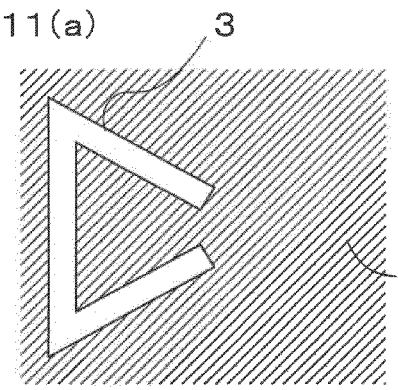
FIGS. 11(a), 11(b), 11(c), 11(d), 11(e), and 11(f) Plan views illustrating other structural examples of the slot according to the first embodiment of the present invention. (First Embodiment)
Figure 11B:
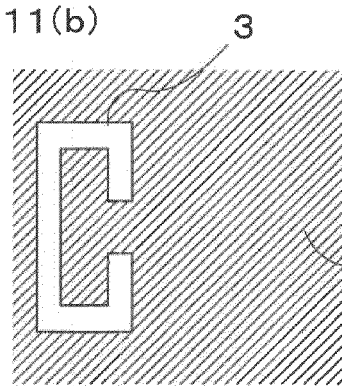
Figure 11C:
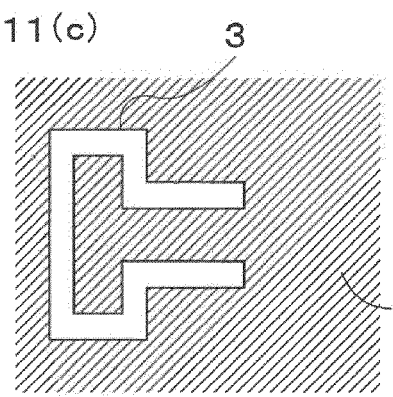
Figure 11D:
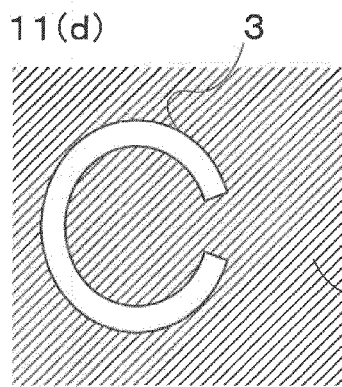
Figure 11E:
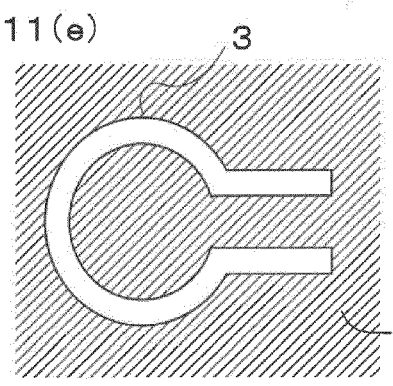
Figure 11F:
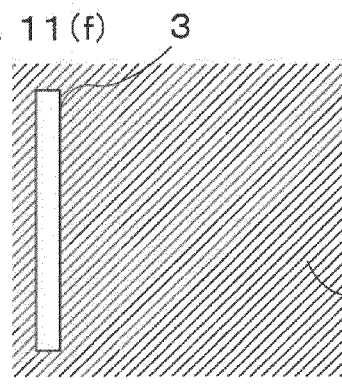

For instance, the slot 3 may be formed to have the shape of an "angular letter U shape" as illustrated in FIG. 10. In this case too, magnetic field coupling occurs in a part of the slot 3 that is parallel to the direction of the internal magnetic field and, accordingly, the same effects as those described above are obtained.

The capacitive coupling means 4a and 4b and the IC chip 5, which are placed above the conductor 2 in FIG. 1, may be placed between the ground conductor 1 and the conductor 2.

In this case, the IC chip 5 is protected from external elements and, at the same time, avoiding forming an unnecessary protrusive structure improves the exterior appearance.

The shape of the slot 3 is not limited to the "angular letter C shape" of FIG. 1, and can be a suitably chosen shape as long as adequate magnetic field coupling is obtained between the microstrip antenna, which is constituted of the ground conductor 1 and the conductor 2, and the slot 3.

For instance, as illustrated in FIGS. 11(a) to 11(f), the shape of the slot 3 can be selected from various shapes including a linear shape, a circular shape, a triangular shape, and a shape in which a circle and a line are combined. The slot 3 may also be formed to have an asymmetrical shape or a rectangular shape with rounded corners.

The first embodiment (FIG. 1) does not make a particular mention of a support relation of the ground conductor 1, the conductor 2, and the capacitive coupling means 4a and 4b. However, a dielectric material (not shown) may be put between (or around) the ground conductor 1, the conductor 2, and the capacitive coupling means 4a and 4b (or the gap between the ground conductor 1 and the conductor 2 and the gap between the conductor 2 and the capacitive coupling means 4a and 4b may be filled with a dielectric material) to support the conductor 2 from the ground conductor 1 via the dielectric material and to support the capacitive coupling means 4a and 4b from the conductor 2 via the dielectric material.

In this case, the relative dielectric constant of the dielectric material interposed between the ground conductor 1 and the conductor 2 and the relative dielectric constant of the dielectric material interposed between the conductor 2 and the capacitive coupling means 4a and 4b may be set to different values at the respective portions.

The capacitive coupling means 4a and 4b may be built on a film substrate or the like which is then stuck to the conductor 2.

In the case where a dielectric material is used, the wireless communication device can be manufactured easily by applying a method in which a conductor pattern is etched onto a dielectric multi-layer substrate, a method in which a resin cast piece and a sheet metal are combined, a method in which a resin cast piece is plated, and the like.

As described above, according to the first embodiment (FIG. 1) of the present invention, the wireless communication device includes the ground conductor (first conductor) 1, the conductor (second conductor) 2, which is disposed substantially parallel to the ground conductor 1, the slot (hole) 3, which is formed in the conductor 2, the capacitive coupling means 4a and 4b, which are disposed adjacent to the slot 3, and the IC chip (communication circuit) 5, which has at least one of a radio wave transmitting function and a radio wave receiving function. The IC chip 5 is connected through the capacitive coupling means 4a and 4b to two sites on the conductor 2 which are near borders between the conductive 2 and the slot 3.

As the two sites to which the IC chip 5 is connected through the capacitive coupling means 4a and 4b, sites that stretch across the slot 3 are chosen.

Impedance matching optimum for the input impedance of the IC chip 5 is thus realized and, accordingly, a broadband wireless communication device is obtained.

Second Embodiment

In the first embodiment (FIG. 1), the slot 3 of the conductor 2 has an arbitrary shape. However, when a slot 3A which has a well thought-out shape is used as illustrated in FIG. 12, the degree of coupling between the microstrip antenna, which is constituted of the ground conductor 1 and the conductor 2, and the slot 3A can be adjusted and the degree of freedom in design is enhanced as a result.

Figure 12:
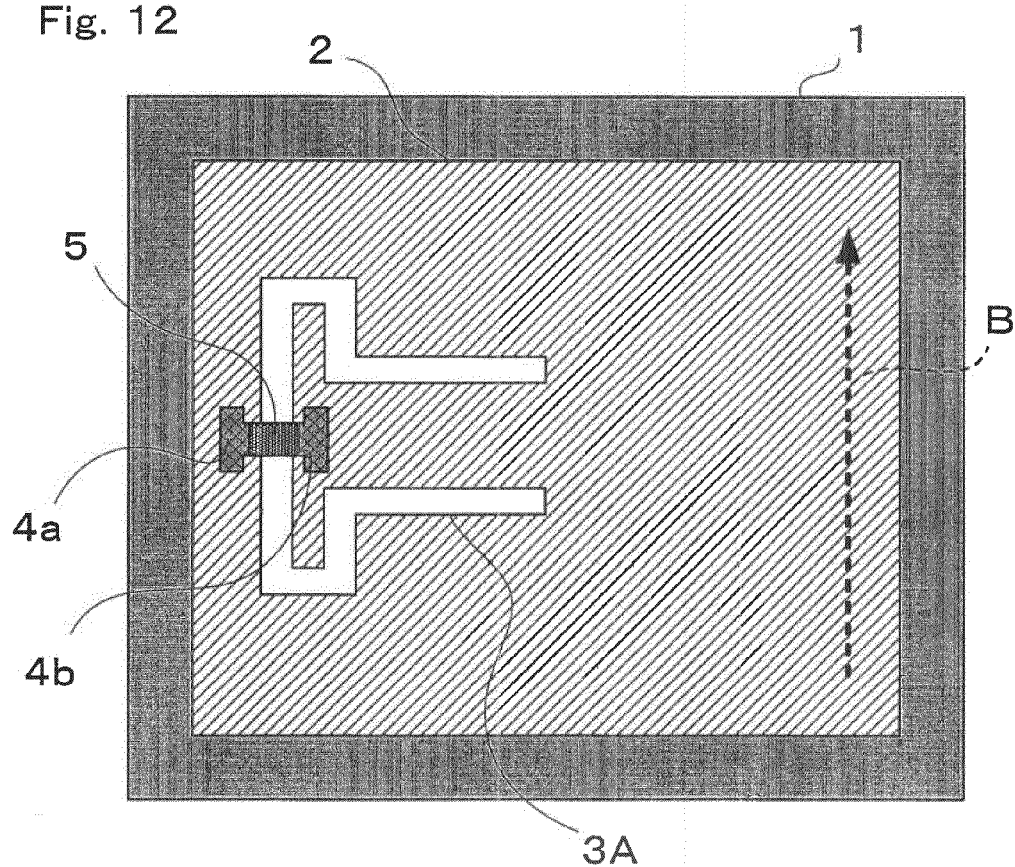
FIG. 12 A plan view illustrating a wireless communication device according to a second embodiment of the present invention. (Second Embodiment)

FIG. 12 is a plan view illustrating an RFID tag that constitutes a wireless communication device according to a second embodiment of the present invention, and uses the same reference symbols to denote the same components as those described above in order to omit detailed descriptions thereof.

FIG. 12 differs from the first embodiment in that a portion substantially parallel to the direction (broken-line arrow B) of the internal magnetic field of the microstrip antenna constituted of the ground conductor 1 and the conductor 2 is created by forming fold-back slot portions in two places (at least one place) in the slot 3A.

Each fold-back slot portion includes parallel opposing slots which are provided at two points set apart from each other within a distance range where the opposing slots affect each other.

Figure 13:
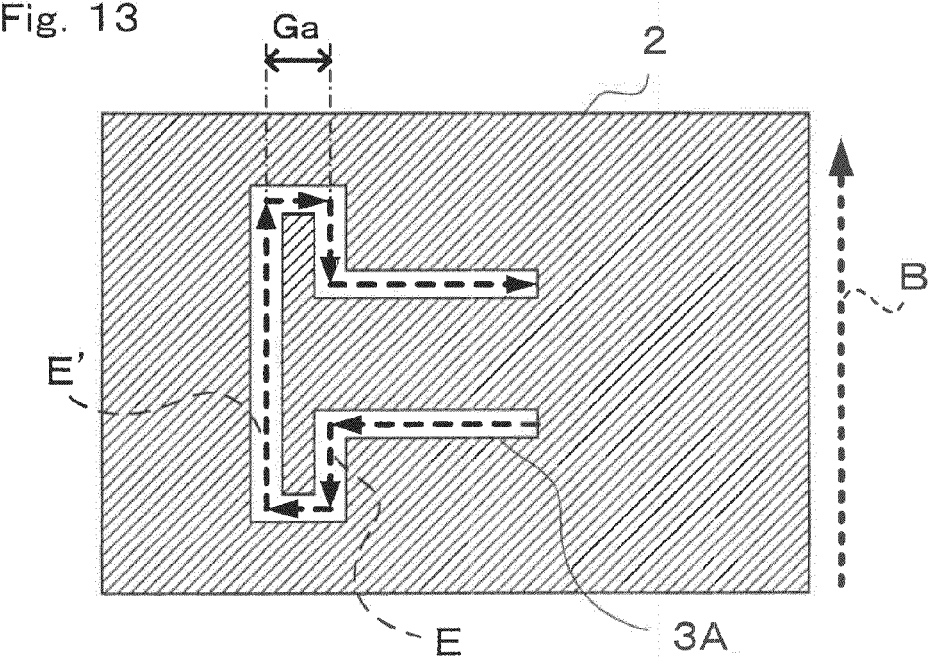
FIG. 13 A plan view illustrating the direction of a magnetic current along a slot at one instant to illustrate the operation in the second embodiment of the present invention. (Second Embodiment)

In the case of the slot 3A formed in the manner illustrated in FIG. 12, the direction of a magnetic current flowing along the slot 3A at one instant is as indicated by the broken-line arrows E and E' (from E to E') in FIG. 13, and a magnetic current E and a magnetic current E' which flow in the substantially parallel opposing slot portions in the slot 3A are in directions opposite from each other. As a result, a canceling effect is generated between magnetic field coupling that occurs in the portion corresponding to the broken-line arrow E of FIG. 13 and magnetic field coupling that occurs in the portion corresponding to the broken-line arrow E' of FIG. 13. The degree of coupling in the wireless communication device of FIG. 12 is therefore smaller than in the first embodiment (FIG. 1).

This effect is beneficial particularly when an unloaded Q of the microstrip antenna constituted of the ground conductor 1 and the conductor 2 is high.

On the other hand, the magnitude of a "twist" in an impedance locus of the microstrip antenna on a Smith chart relates to the input resistance of the microstrip antenna, and the "twist" is generally greater when the input resistance is higher.

The input resistance and the unloaded Q have a proportional relation and the input resistance is higher when the unloaded Q is higher, which means that the "twist" is greater when the unloaded Q is higher. Therefore, in order to realize optimum impedance matching, the "twist" needs to be made small by setting small the degree of coupling between the microstrip antenna and the slot 3A.

However, when the microstrip antenna constituted of the ground conductor 1 and the conductor 2 is reduced in size and thickness, making the offset interval D (see FIG. 8) of the slot 3 as large as possible and making the magnetic field coupling length Ws as small as possible do not always ensure that a small enough degree of coupling is set.

This is not the case for the wireless communication device according to the second embodiment where the degree of coupling can be adjusted with an interval Ga between the substantially parallel portions (opposing slots) of the slot 3A as a third parameter.

Figure 14:
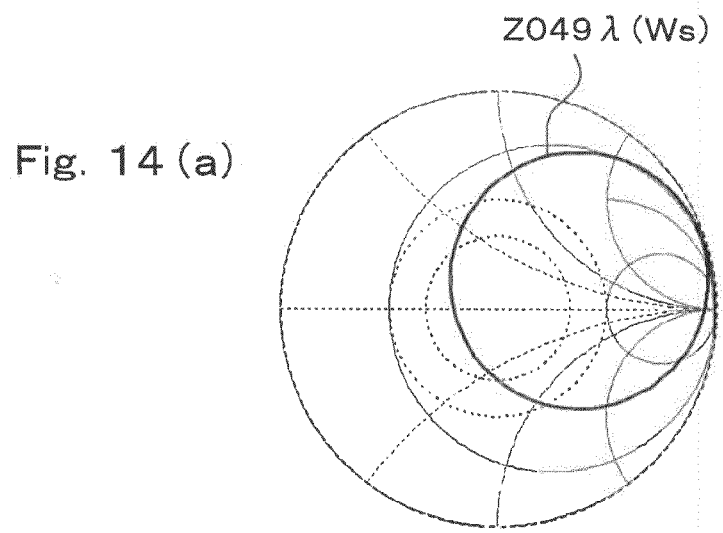
FIGS. 14(a), 14(b), and 14(c) Smith charts illustrating variations in impedance characteristics that depend on the slot shape in the second embodiment of the present invention.
Figure 14:
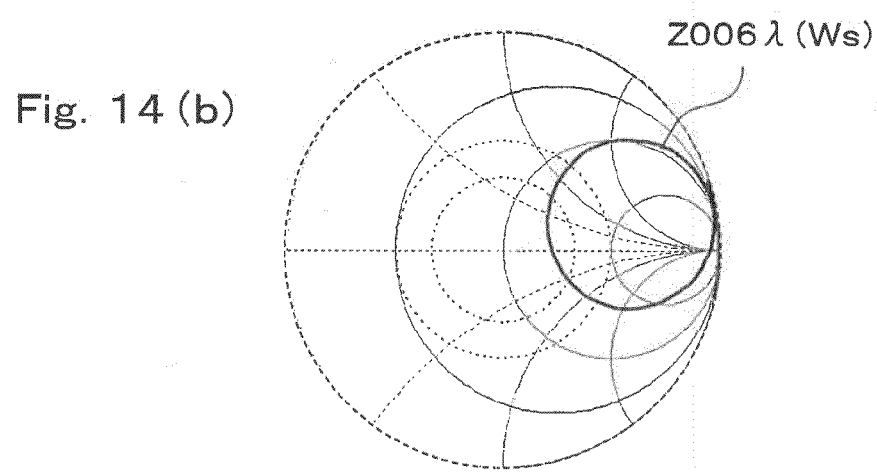
Figure 14:
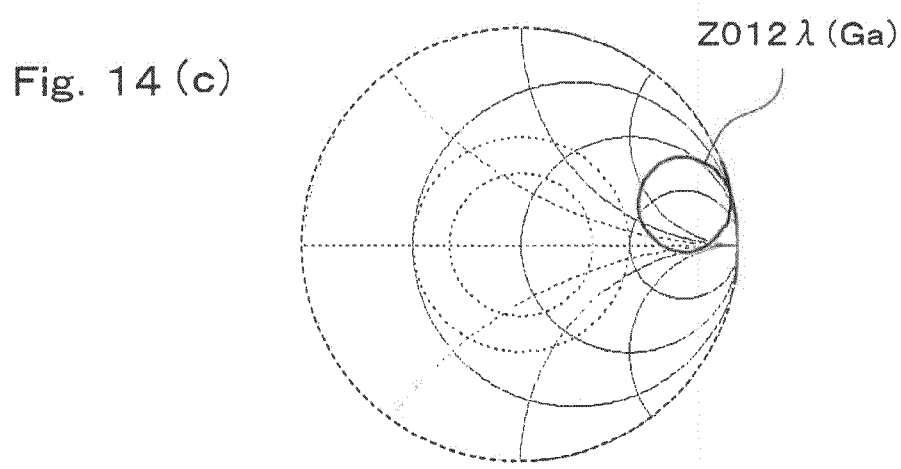

FIGS. 14(a) to 14(c) are Smith charts illustrating variations in impedance characteristics, and illustrate an example of changes observed when the shape of the slot 3A is changed in setting specifications where the unloaded Q of the microstrip antenna constituted of the ground conductor 1 and the conductor 2 is approximately 100.

In FIG. 14(a), Z049λ (Ws) represents an impedance locus observed when the slot shape of the first embodiment (FIG. 1) (in which fold-back slot portions are not formed) is employed and the magnetic field coupling length Ws is set to 0.049λ. In FIG. 14(b), Z006λ (Ws) represents an impedance locus observed when the slot shape of the first embodiment (FIG. 1) is employed and the magnetic field coupling length Ws is set to 0.006λ.

In FIG. 14(c), Z012λ (Ga) represents an impedance locus observed when the slot shape of the second embodiment (FIG. 12) is employed, the magnetic field coupling length Ws is set to 0.049λ, and the interval Ga is set to 0.012λ.

In any of FIGS. 14(a) to 14(c), the offset interval D is set to 0.106λ and the slot 3A has the same total length.

A comparison among FIGS. 14(a) to 14(c) reveals that a "twist" in an impedance locus on a Smith chart can be set small when the magnetic field coupling length Ws is reduced from Ws of FIG. 14(a) to Ws of FIG. 14(b). However, reducing the magnetic field coupling length Ws alone is not enough, and employing the slot 3A which is provided with fold-back slot portions as illustrated in FIGS. 12 and 13 reduces the "twist" more effectively as evidenced by the reduction from the "twist" of FIG. 14(a) to the "twist" of FIG. 14(c). Considering that the magnetic field coupling length Ws needs to be set to a certain length or longer in order to secure a space for packaging the IC chip 5 in practice, the shape of the slot 3A according to the second embodiment is favorable for the adjustment of the degree of coupling.

As described above, in the wireless communication device according to the second embodiment (FIGS. 12 and 13) of the present invention, the slot 3A has in some places fold-back slot portions which are substantially parallel to the portions of the slot 3A that are parallel to the direction (broken-line arrow B) of the internal magnetic field of the microstrip antenna constituted of the ground conductor 1 and the conductor 2.

This way, by choosing an appropriate interval for the interval Ga between the substantially parallel portions of the slot 3A, an optimum degree of coupling is obtained even when the unloaded Q of the microstrip antenna is high, and impedance matching optimum for the input impedance of the IC chip 5 is realized. A broadband wireless communication device is thus obtained.

The interval Ga is set such that the portions of the slot 3A that are parallel to the internal magnetic field (broken-line arrow B) of the microstrip antenna are within a distance range where the parallel portions affect each other (for example, 0.05λ or less of the wavelength λ with respect to the center frequency of the frequency used). Desirably, the interval Ga is set as small as 0.01λ, and the degree of coupling is optimized by adjusting the offset amount D (see FIG. 6) of the slot 3A.

Third Embodiment

Figure 15:
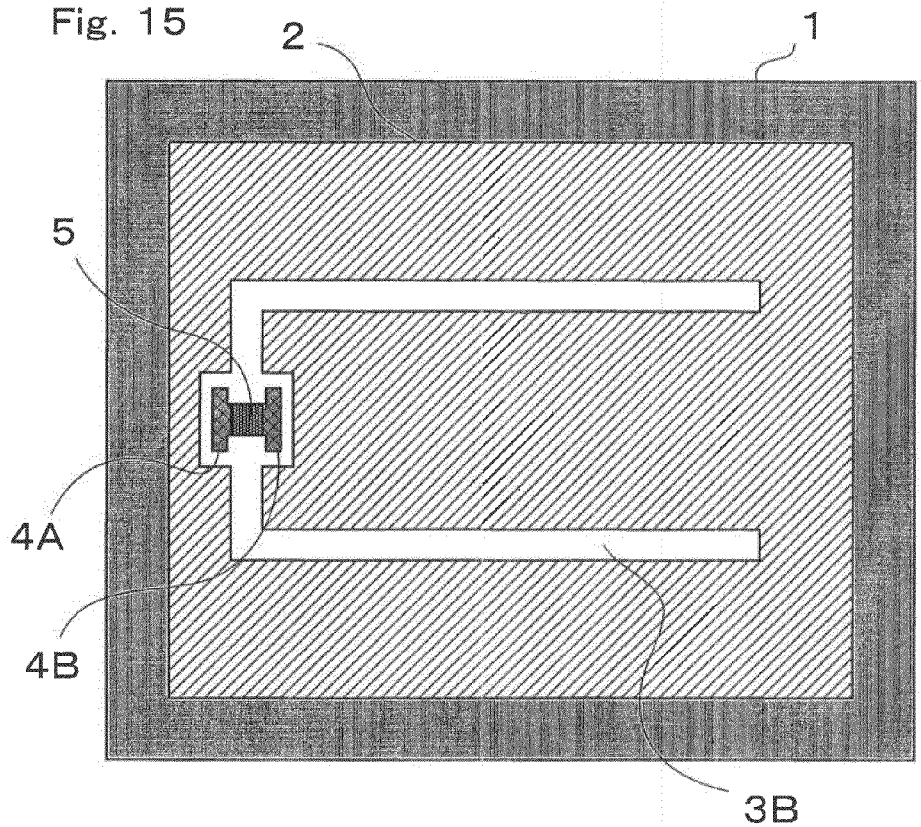
FIG. 15 A plan view illustrating a wireless communication device according to a third embodiment of the present invention. (Third Embodiment)

In the first and second embodiments (FIG. 1 and FIG. 12), the capacitive coupling means 4a and 4b are formed from a structure stacked on top of the slot 3 of the conductor 2, but may instead be formed on the same plane as that of a slot 3B as illustrated in FIG. 15.

FIG. 15 is a plan view illustrating an RFID tag that constitutes a wireless communication device according to a third embodiment of the present invention, and uses the same reference symbols to denote the same components as those described above (see FIG. 1) in order to omit detailed descriptions thereof.

FIG. 15 differs from the first and second embodiments in that capacitive coupling means 4A and 4B are provided on a plane common to the slot 3B.

In this case, the capacitive coupling means 4A and 4B are each constituted of a third conductor, and the capacitive coupling means 4A is disposed adjacent to one side of the slot 3B whereas the capacitive coupling means 4B is disposed adjacent to the other side of the slot 3B.

The capacitive coupling means 4A and 4B are also constructed to be coupled by capacitive coupling to the sides of the slot 3B, and are constituted of, for example, linear conductors.

Figure 16:
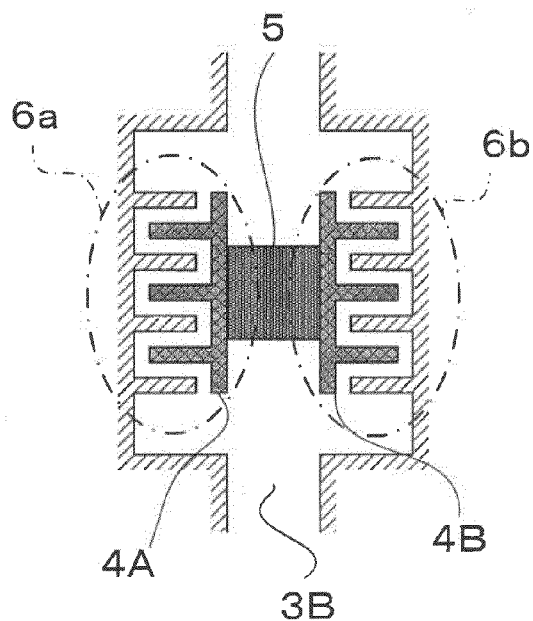
FIG. 16 An enlarged plan view illustrating a concrete structural example of the wireless communication device according to the third embodiment of the present invention. (Third Embodiment)

Instead of linear conductors, interdigital capacitors 6a and 6b, for example, may be used as the capacitive coupling means 4A and 4B as illustrated in FIG. 16, in order to secure a large coupling capacitance.

In FIG. 16, the interdigital capacitors 6a and 6b are constituted of comb teeth-shaped sides of the capacitive coupling means 4A and 4B and comb teeth-shaped sides of the slot 3B which face the capacitive coupling means 4A and 4B.

When the structure of FIG. 15 or the structure of FIG. 16 is employed, the series capacitance C is formed from the capacitive coupling means 4A and 4B as in the cases described above.

In FIGS. 15 and 16, the rest of the structure and operation is the same as in the first embodiment. An equivalent circuit of the wireless communication device according to the third embodiment is therefore practically the same as the circuit illustrated in FIG. 5.

This means that the impedance can be matched with an arbitrary load impedance also in the wireless communication device according to the third embodiment which is illustrated in FIG. 15 or 16.

In other words, impedance matching optimum for the input impedance of the IC chip 5 is realized and a broadband wireless communication device is obtained.

The capacitive coupling means 4A and 4B can be manufactured at the same time as the conductor 2 by a method in which a conductor pattern is etched onto a dielectric substrate or by other methods, and the manufacture is accordingly easy.

Figure 17:
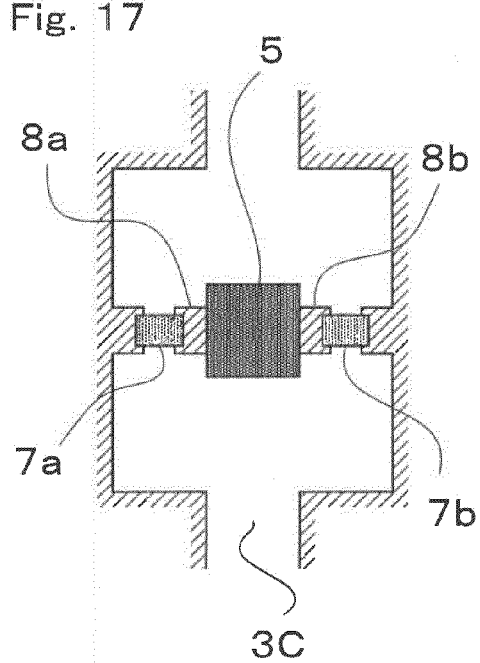
FIG. 17 An enlarged plan view illustrating another concrete structural example of the wireless communication device according to the third embodiment of the present invention. (Third Embodiment)

Instead of the interdigital capacitors 6a and 6b (FIG. 16), chip capacitors 7a and 7b and third conductors 8a and 8b may be used to constitute the capacitive coupling means 4a and 4b as illustrated in FIG. 17.

In FIG. 17, one end of each of the chip capacitors 7a and 7b is connected to an inner edge of a slot 3C, and the other end of each of the chip capacitors 7a and 7b is connected to the IC chip 5 through the third conductors 8a and 8b.

When the structure of FIG. 17 is employed, too, the same effects as in the first embodiment are obtained and, in addition, the manufacture is easy because the chip capacitors 7a and 7b can be mounted at the same time the IC chip 5 is mounted.

As described above, in the wireless communication device according to the third embodiment of the present invention, the capacitive coupling means 4A and 4B include the third conductors connected to terminals of the IC chip (communication circuit) 5, and the capacitive coupling means 4A and 4B are constructed by coupling the conductor 2 (sides of the slot 3B) to the third conductors through capacitive coupling.

As illustrated in FIG. 16, the capacitive coupling means 4A and 4B are formed from the third conductors and are constituted of the interdigital capacitors 6a and 6b together with the slot 3B.

Alternatively, the capacitive coupling means are constituted of the chip capacitors 7a and 7b and the third conductors 8a and 8b as illustrated in FIG. 17.

Impedance matching optimum for the input impedance of the IC chip 5 is thus realized as in the cases described above, and broadband wireless communication device is accordingly obtained.

Further, the manufacture is easy because the capacitive coupling means 4A and 4B that are formed on the same plane as the slot 3B can be manufactured at the same time as the conductor 2 by a method in which a conductor pattern is etched onto a dielectric substrate, or by other methods.

Fourth Embodiment

Figure 18:
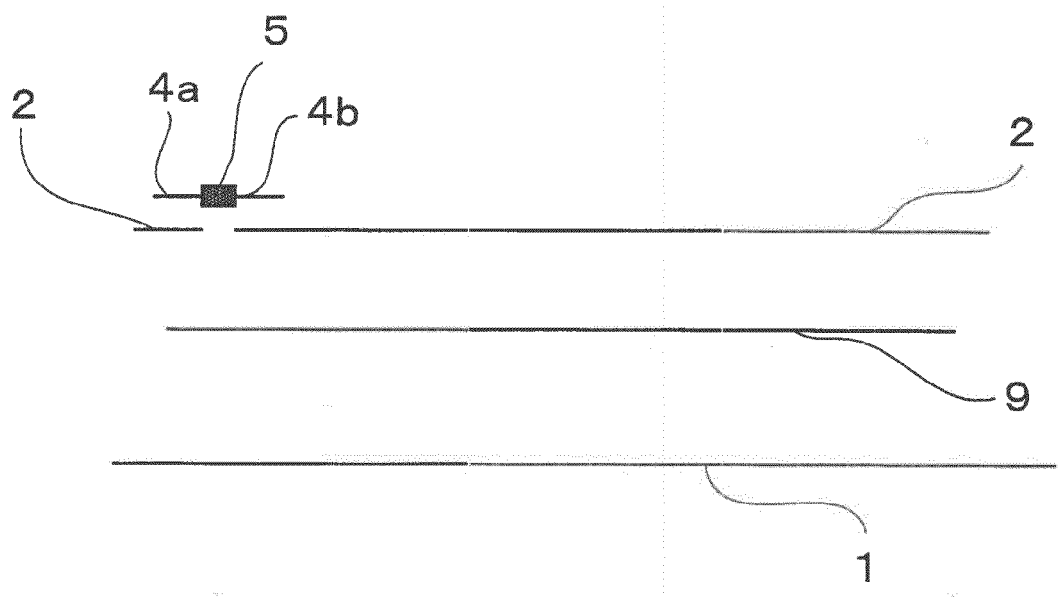
FIG. 18 A sectional view illustrating a wireless communication device according to a fourth embodiment of the present invention. (Fourth Embodiment)

Although no particular mention is made in the first to third embodiments, a parasitic element 9 may be added in a place where the parasitic element 9 is coupled by magnetic field coupling to the conductor 2 to generate multi-resonance as illustrated in FIG. 18.

FIG. 18 is a sectional view illustrating an RFID tag that constitutes a wireless communication device according to a fourth embodiment of the present invention, and uses the same reference symbols to denote the same components as those described above (see FIG. 1) in order to omit detailed descriptions thereof.

Here, application to the wireless communication device of FIG. 1 is taken as an example in which the parasitic element 9 is installed between the ground conductor 1 and the conductor 2.

In FIG. 18, the parasitic element 9 is disposed in a place where the parasitic element 9 is coupled by magnetic field coupling to the conductor 2 to generate multi-resonance, and has an electrical length that causes resonance around a resonant frequency in the operating frequency band of the wireless communication device (within the operating frequency band or near the operating frequency band). The rest of the structure and operation is the same as in the first embodiment.

It is known that, in a microstrip antenna provided with the parasitic element 9, multi-resonance characteristics are obtained generally through coupling between a driven element, which is the radiating conductor, and the parasitic element 9. It is also known that choosing an appropriate shape for the parasitic element 9 and an appropriate positional relation between the driven element and the parasitic element 9 broadens the operating frequency band.

Therefore, when structured as illustrated in FIG. 18, the wireless communication device can have an operating frequency band even broader than in the wireless communication device described above (FIG. 1).

While the parasitic element 9 is disposed between the ground conductor 1 and the conductor 2 in FIG. 18, the placement and structure of the parasitic element 9 are not limited to the example of FIG. 18 as long as multi-resonance characteristics are obtained through magnetic field coupling between the parasitic element 9 and the conductor (radiating conductor) 2.

For instance, the parasitic element 9 may be disposed on the opposite side of the ground conductor 1 viewed from the conductor 2, a place adjacent to the conductor 2 in an x direction or a y direction, or the like.

In the structure of FIG. 18, the parasitic element 9 is added to the wireless communication device of the first embodiment (FIG. 1). However, the present invention is not limited to this example, and it goes without saying that the same effects are obtained when the parasitic element 9 is added to the wireless communication devices of the second and third embodiments (FIG. 12 and FIGS. 15 to 17).

Fifth Embodiment

Figure 19:
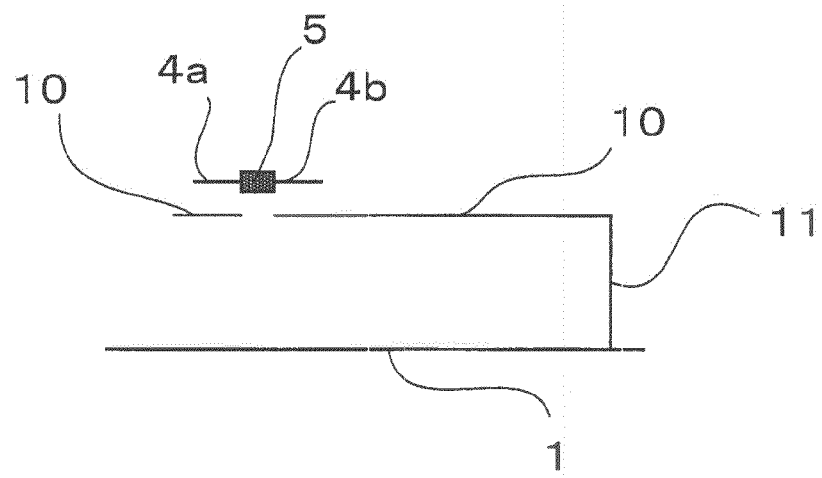
FIG. 19 A sectional view illustrating a wireless communication device according to a fifth embodiment of the present invention. (Fifth Embodiment)

Although no particular mention is made in the first to fourth embodiments, a short-circuit conductor (fourth conductor) 11 may be connected to an edge of a conductor (second conductor) 10 to connect the conductor 10 by a short circuit to the ground conductor (first conductor) 1 via the short-circuit conductor 11 as illustrated in FIG. 19.

FIG. 19 is a sectional view illustrating an RFID tag that constitutes a wireless communication device according to a fifth embodiment of the present invention, and uses the same reference symbols to denote the same components as those described above (see FIG. 1) in order to omit detailed descriptions thereof.

In FIG. 19, the length of the conductor 10 in the resonance direction is set to substantially half that of the conductor 2 described above (FIG. 1).

The short-circuit conductor 11 connects by a short circuit a part (an edge) of the perimeter of the conductor 10 and the ground conductor 1. A so-called short-patch antenna is thus constructed.

It is well known that, in a microstrip antenna, an electric current on a radiating conductor generally reaches zero at both ends in the resonance direction. It is also well known that, when a radiating conductor resonates at a wavelength approximately half a signal wave and an electric current of a standing wave appears on the radiating conductor, the electric current reaches maximum at the center of the radiating conductor.

In the standing wave, the voltage phase is offset by 90 degrees from the electric current phase, which makes an electric field zero at the center of the radiating conductor in the resonance direction.

Therefore, short-circuiting the radiating conductor and the ground conductor 1 at the center of the radiating conductor and setting the radiating conductor to a half size do not change the electromagnetic field distribution inside the microstrip antenna.

A short-patch antenna is obtained by utilizing this principle and adapting the length of the radiating conductor in the resonance direction to a wavelength approximately quarter that of the signal wave for size reduction. In the wireless communication device of FIG. 19, an antenna constituted of the ground conductor 1, the conductor 10, and the short-circuit conductor 11 corresponds to the short-patch antenna.

The impedance characteristics of the short-patch antenna are parallel resonance characteristics as in a normal microstrip antenna. An equivalent circuit of the wireless communication device of FIG. 19 is therefore the same as the circuit of FIG. 5. The rest of the structure and operation is the same as in the first embodiment.

The wireless communication device according to the fifth embodiment (FIG. 19) of the present invention includes the short-circuit conductor (fourth conductor) 11 connected to an edge of the conductor 10 that corresponds to a place where an electric field is zero at the center of the conductor 10 in the resonance direction. The conductor 10 is structured to have an approximately half length in the resonance direction, and an edge of the conductor 10 is connected by a short circuit to the ground conductor (first conductor) 1 via the short-circuit conductor 11.

In this wireless communication device as described above, where the length in the resonance direction of the conductor 10 used is approximately half that of the conductor 2 described above (FIG. 1), the length of the conductor 10 in the resonance direction is cut in half and the ground conductor 1 is also reduced compared to the first embodiment.

As a result, the size of the wireless communication device can be reduced to approximately half the size in the first embodiment.

FIG. 19 takes as an example the structure in which the conductor 2 of the first embodiment (FIG. 1) is replaced by the conductor 10 having a length approximately half that of the conductor 2. However, the structure of the short-patch antenna type wireless communication device is not limited to the example of FIG. 19. For instance, the conductor 2 of the third embodiment or of the second to fourth embodiments (FIG. 12 and FIGS. 15 to 18)) may be replaced by the conductor 10.

Sixth Embodiment

In the first to fifth embodiments (FIG. 1, FIG. 12, and FIGS. 15 to 19), capacitive coupling means are provided separately from the IC chip 5. Capacitive coupling means may instead be built inside an IC chip 5A as illustrated in FIG. 20.

Figure 20:
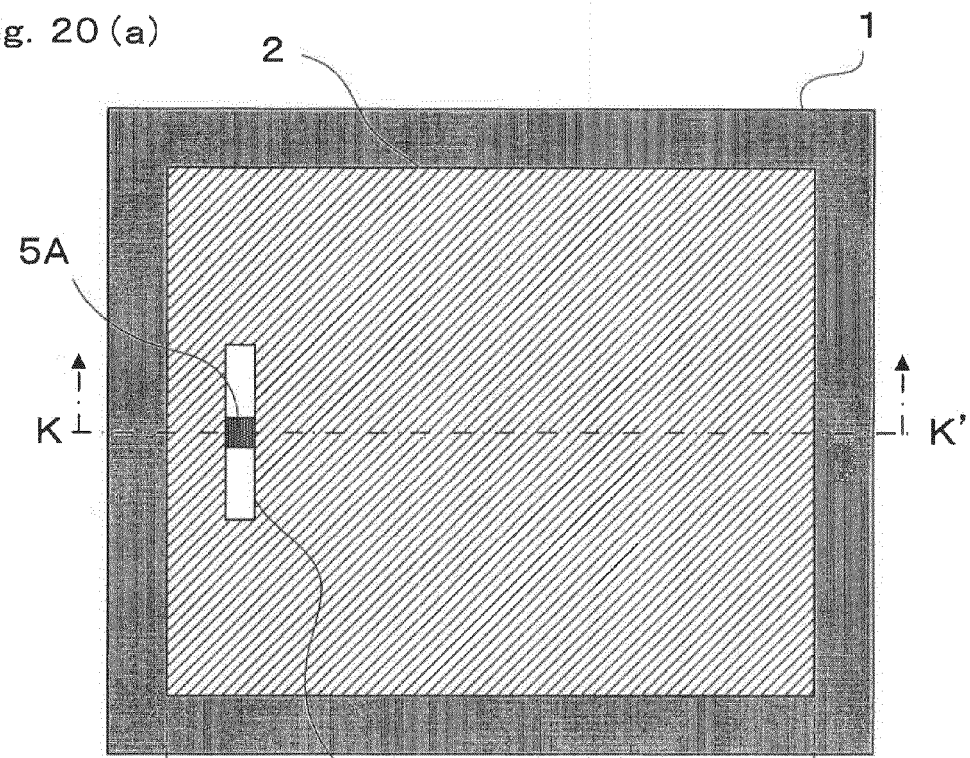
FIGS. 20(a) and 20(b) Plan views illustrating a wireless communication device according to a sixth embodiment of the present invention. (Sixth Embodiment)
Figure 20:
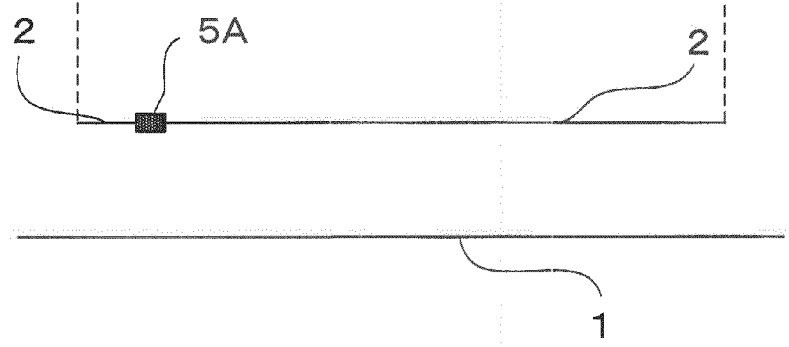

FIG. 20 are a plan view and a sectional view illustrating an RFID tag that constitutes a wireless communication device according to a sixth embodiment of the present invention, and uses the same reference symbols to denote the same components as those described above (see FIG. 1) in order to omit detailed descriptions thereof.

FIG. 20(*a*) is a plan view, and FIG. 20(*b*) is a sectional view taken along the line K-K' of FIG. 20(*a*).

The first to fifth embodiments need to attach the capacitive coupling means 4a and 4b after the slot length Ls is adjusted, in order to obtain the inductance L and capacitance C of FIG. 5 (equivalent circuit). A circuit corresponding to the inductance L and capacitance C of FIG. 5 can be built inside the IC chip 5A (communication circuit) as illustrated in FIG. 20, owing to the improvement in IC circuit integration technology.

In the sixth embodiment of the present invention which is illustrated in FIG. 20, the capacitive coupling means 4a and 4b are removed from FIG. 1 and the IC chip 5A which includes the circuit function of the capacitive coupling means 4a and 4b is connected to the slot 3.

The IC chip 5A is an integrated circuit having a storing function, a computing function, a transmitting/receiving function, and other functions. The IC chip 5A includes a series LC resonant circuit constituted of the inductance L and capacitance C of the circuit illustrated in FIG. 5.

Capacitive coupling means in this case is constituted of a series capacitance circuit or series LC circuit within the IC chip 5A.

When the structure of FIG. 20 is employed, the IC chip 5A is connected to the slot 3 via the series LC resonant circuit.

As in the first embodiment, a magnetic field generated in the slot 3 is coupled by magnetic field coupling to the internal magnetic field of the microstrip antenna constituted of the ground conductor 1 and the conductor 2.

An equivalent circuit of the wireless communication device of FIG. 20 is therefore practically the same as the circuit of FIG. 5.

This means that, the impedance can be matched with an arbitrary load impedance in the wireless communication device of FIG. 20 as well.

In other words, impedance matching optimum for the input impedance of the IC chip 5A is realized and a broadband wireless communication device is obtained.

Moreover, because there is no need to attach the capacitive coupling means 4a and 4b, the manufacture is easier and the cost can be lowered.

Although the inductance L and the capacitance C are built inside the IC chip 5A in the wireless communication device described above, the inductance L may be obtained by adjusting the slot length Ls instead of building the inductance L inside the IC chip 5A.

FIG. 20 deal with a case where the IC chip 5A is applied to the structure of FIG. 1 (first embodiment). However, the IC chip 5A is not limited to the structural example of FIG. 20, and is equally applicable to the structures of FIG. 12 and FIGS. 15 to 19 (second to fifth embodiments).

Seventh Embodiment

Although no particular mention is made in the first to sixth embodiments, an input impedance at the feeding point (the portion where the IC chip 5 is mounted) of the antenna and the input impedance of the IC chip 5 may be adjusted to have a complex conjugate relation.

The input impedance of the IC chip 5 generally has a high capacitive reactance (capacitance) and, in the case where the impedance of the IC chip 5 and the impedance of the antenna are to be matched, an input impedance at the feeding point (the portion where the IC chip 5 is mounted) of the antenna needs to be adjusted to have a complex conjugate relation with the input impedance of the IC chip 5. In other words, the input impedance of the antenna needs to have a high inductive reactance (inductance).

As described above, the operation of the wireless communication device can be described with the circuit of FIG. 5, and the input inductance of the microstrip antenna constituted of the ground conductor 1 and the conductor 2 can be adjusted by adjusting the length of the slot 3.

When the input capacitance of the IC chip 5 is relatively high (approximately several hundreds Ω), an appropriate length is chosen for the slot 3 to adjust the input reactance of the microstrip antenna constituted of the ground conductor 1 and the conductor 2 so as to form a complex conjugate relation with the input capacitance of the IC chip 5. The degree of coupling is adjusted simultaneously byway of the offset point D and shape of the slot 3 (for example, the shape of the slot 3A of FIG. 12).

This way, impedance matching is realized over a broad band without using the capacitive coupling means 4.

Moreover, because there is no need to attach the capacitive coupling means 4, the manufacture is easier and the cost can be lowered.

Another advantage is that the circuit is simplified even when the capacitive coupling means is built inside the IC chip 5C as in the sixth embodiment.

REFERENCE SIGNS LIST 1 ground conductor (first conductor), 2, 10 conductor (second conductor), 3, 3A, 3B, 3C slot (slot line), 4a, 4b, 4A, 4B capacitive coupling means, 5, 5A IC chip, 7a, 7b chip capacitor (capacitor), 8a, 8b third conductor, 9 parasitic element, 11 short-circuit conductor (fourth conductor), F feeding point, Ga interval between opposing slots

The invention claimed is:

1. A wireless communication device, comprising:
a first conductor;
a second conductor which is disposed substantially parallel to the first conductor;
a hole which is formed in the second conductor;
capacitive coupling means which are disposed adjacent to the hole; and
a communication circuit which has at least one of a radio wave transmitting function and a radio wave receiving function,
wherein the hole contains a magnetic field coupling element magnetically coupled with a microstrip antenna consisting of the first conductor and the second conductor and an inductance element which forms inductance,
wherein the communication circuit is connected through the capacitive coupling means to the two sites on the second conductor that are near borders between the second conductor and the hole, and
wherein the degree of coupling between the hole and the microstrip antenna, the inductance, and the capacitance are adjusted independently so that impedance can be matched with an arbitrary load impedance.

2. A wireless communication device according to claim 1, wherein the hole is formed from a slot line.

3. A wireless communication device according to claim 2, wherein, as the two sites to which the communication circuit is connected through the capacitive coupling means, sites that stretch across the slot line are chosen.

4. A wireless communication device according to claim 1,
wherein the capacitive coupling means include third conductors connected to terminals of the communication circuit, and
wherein the capacitive coupling means are constructed by coupling the second conductor to the third conductors through capacitive coupling.

5. A wireless communication device according to claim 4, wherein the capacitive coupling means are constituted of interdigital capacitors.

6. A wireless communication device according to claim 4, wherein the capacitive coupling means are constituted of chip capacitors.

7. A wireless communication device according to claim 1, further comprising:
a parasitic element which is disposed in a place where the parasitic element is coupled by magnetic field coupling to the second conductor to generate multi-resonance,
wherein the parasitic element has an electrical length that causes resonance within a range of an operating frequency band of the wireless communication device or near the operating frequency band.

8. A wireless communication device according to claim 1, further comprising a fourth conductor which is connected to an edge of the second conductor that corresponds to a place where an electric field is zero at a center of the second conductor in a resonance direction,
wherein the second conductor is structured to have an approximately half length in the resonance direction, and the edge of the second conductor is connected by a short circuit to the first conductor via the fourth conductor.

9. A wireless communication device according to claim 1, wherein the capacitive coupling means are constituted of a series capacitance circuit within the communication circuit.

10. A wireless communication device according to claim 1, wherein the capacitive coupling means are constituted of a series LC circuit within the communication circuit.

11. A wireless communication device according to claim 2, wherein the slot line comprises at least one fold-back slot portion, and
wherein the at least one fold-back slot portion comprises parallel opposing slots which are provided at two points set apart from each other within a distance range where the opposing slots affect each other.

12. A wireless communication device according to claim 11, wherein the distance between the opposing slots is set to 0.05 times or less a wavelength with respect to a center frequency of a frequency used.

13. A wireless communication device, comprising:
a first conductor;
a second conductor which is disposed substantially parallel to the first conductor;
a hole which is formed in the second conductor; and
a communication circuit which has at least one of a radio wave transmitting function and a radio wave receiving function,
wherein the hole contains a magnetic field coupling element magnetically coupled with a microstrip antenna consisting of the first conductor and the second conductor and an inductance element which forms inductance,
wherein the communication circuit is connected through capacitive coupling means to the two sites on the second conductor that are near borders between the second conductor and the hole, and
wherein the degree of coupling between the hole and the microstrip antenna, and the inductance are adjusted independently, and the input reluctance of the microstrip antenna is adjusted so as to form a complex conjugate relationship with the input capacitance of the communication circuit so that impedance can be matched with an arbitrary load impedance.

14. A wireless communication device according to claim 13, wherein the hole is formed from a slot line.

15. A wireless communication device-according to claim 13, further comprising a parasitic element which is disposed in a place where the parasitic element is coupled by magnetic field coupling to the second conductor to generate multi-resonance,
 wherein the parasitic element has an electrical length that causes resonance within a range of an operating frequency band of the wireless communication device or near the operating frequency band.

16. A wireless communication device according to claim 13, further comprising a fourth conductor which is connected to an edge of the second conductor that corresponds to a place where an electric field is zero at a center of the second conductor in a resonance direction,
 wherein the second conductor is structured to have an approximately half length in the resonance direction, and the edge of the second conductor is connected by a short circuit to the first conductor via the fourth conductor.

17. A wireless communication device according to claim 14,
 wherein the slot line comprises at least one fold-back slot portion, and
 wherein the at least one fold-back slot portion comprises parallel opposing slots which are provided at two points set apart from each other within a distance range where the opposing slots affect each other.

18. A wireless communication device according to claim 17, wherein the distance between the opposing slots is set to 0.05 times or less a wavelength with respect to a center frequency of a frequency used.

* * * * *